F. W. HILD, F. P. MAIZE & W. L. COOP.
SUPPLEMENTAL SEAT FOR CARS.
APPLICATION FILED OCT. 2, 1914.
1,176,447.
Patented Mar. 21, 1916.
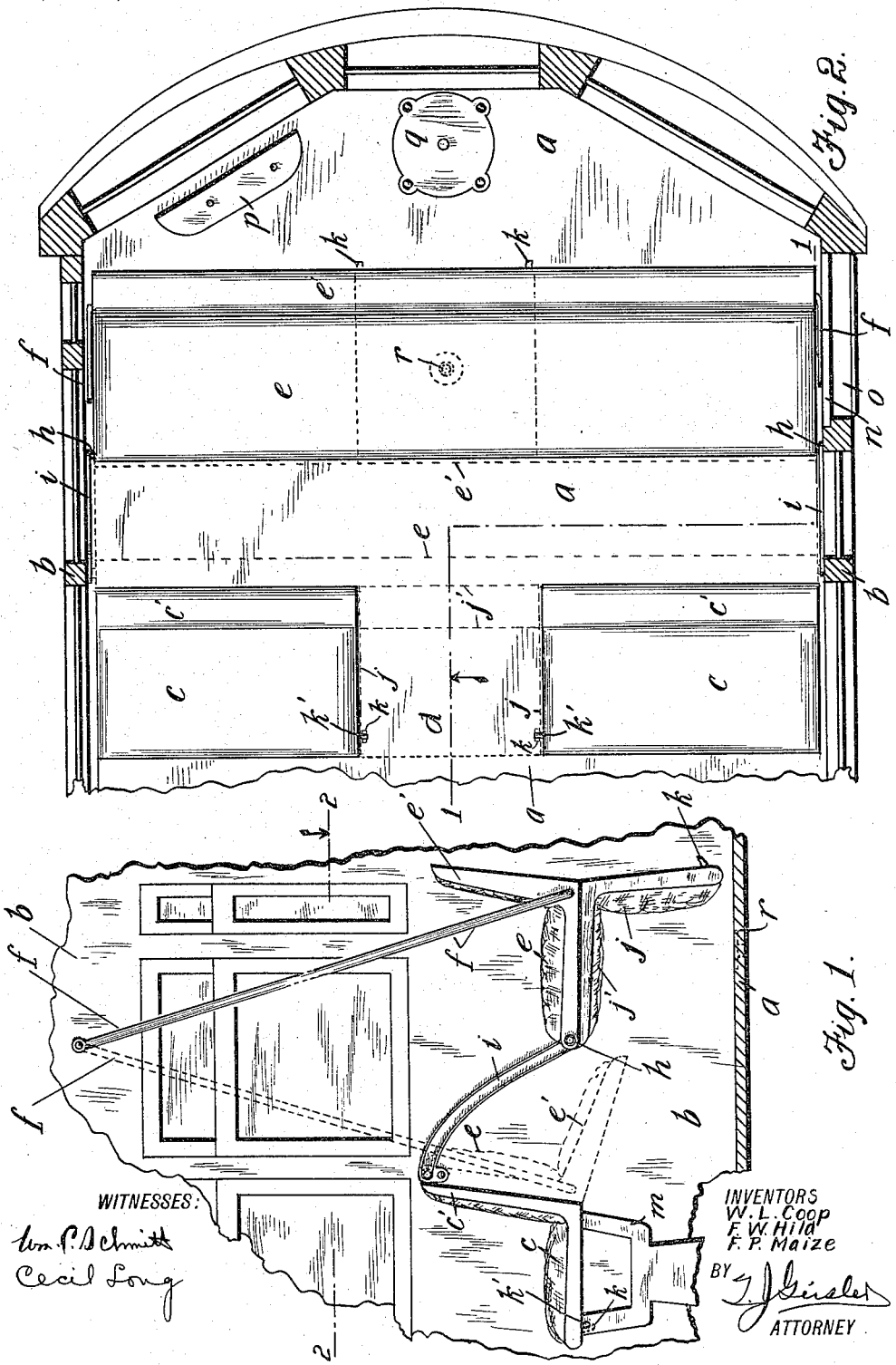
WITNESSES:
INVENTORS
W. L. Coop
F. W. Hild
F. P. Maize
BY
ATTORNEY
THE COLUMBIA PLANOGRAPH CO., WASHINGTON, D. C.

UNITED STATES PATENT OFFICE.

FREDERIC W. HILD, FRANK P. MAIZE, AND WILLIAM LEWIS COOP, OF PORTLAND, OREGON.

SUPPLEMENTAL SEAT FOR CARS.

1,176,447.  Specification of Letters Patent.  Patented Mar. 21, 1916.

Application filed October 2, 1914. Serial No. 864,696.

*To all whom it may concern:*

Be it known that we, FREDERIC W. HILD, FRANK P. MAIZE, and WILLIAM L. COOP, citizens of the United States, and residents, respectively, of the city of Portland, county of Multnomah, State of Oregon, have invented a certain new and useful Improvement in Supplemental Seats for Cars, of which the following is a specification.

Our invention relates more particularly to center entrance cars.

It has for its object the providing of an additional seat in the rear end of the car, relative to the direction in which the car is traveling, for the purpose of increasing the seating capacity.

In cars of the type mentioned, space is only required for the motorman at the forward end of the car, and by our invention we provide additional seats at both ends of the car, which seats may be placed in service alternately, and arranged out of the way when the space occupied by such additional seats is required by the motorman.

Incidentally our invention has for its object the partitioning off of the space occupied by the motorman from that occupied by the passengers.

The details and features of our invention are readily understood by having reference to the accompanying drawings, in which:

Figure 1 is a partial vertical section (taken on the dot-and-dash line 1 of Fig. 2) of one end of a center-entrance street-car provided with cross seats, and this figure shows the practical application of our invention; and Fig. 2 is a horizontal section of the same end of the car, the section being taken on the broken line 2 of Fig. 1.

$a$ is the floor, and $b$, $b$, the sides of a center-entrance street-car. It is assumed that the car is traveling in a left-hand direction.

$c$, $c$, are cross-seats of the usual type and $c'$ the backs thereof.

$d$ is an aisle space between the cross-seats.

$e$ is a supplemental seat having a back $e'$. The supplemental seat is supported at its ends by pendent swinging rods $f$, the rods being pivoted at the top to the sides of the car, and at the bottom to the ends of the supplemental seat $e$. The supplemental seat is provided with laterally projecting guide pins $h$, preferably provided with anti-friction rollers, which travel in the guideways $i$ fastened to the sides of the car. On the bottom of the seat $e$ is provided an auxiliary seat $j$, also having a back $j'$. The seat $j$ and its back $j'$ are arranged to fit and fill in the aisle space between the cross seats $c$ and their backs $c'$.

In order to secure the supplementary seat in place, when moved into coöperative relation with the cross seats $c$, $c$, the former is provided with latch hooks $k$, and the latter with the latch pins $k'$ projecting from the inner standards $m$, as shown in Fig. 1. The movement of the supplemental seat into and out of coöperative relation with the cross seats is illustrated in Fig. 1.

When the car is traveling in a left-hand direction, the supplemental seat is arranged as shown in Fig. 1, the weight of the seat, $e$, holding the same at the bottom of the groove of the guideway $i$. When the car is traveling in the opposite direction, the supplemental seat is moved into the position in which it is shown in broken outline in Figs. 1 and 2. When so arranged it not only furnishes an additional seat in the aisle space between the cross seats $c$, $c$, but also serves to partition off the space occupied by the motorman from that occupied by the passengers.

The ends of the car are provided with a door $n$ and step $o$ for the motorman, as usual.

$p$ represents the controller box, $q$ an air brake valve, and $r$ a socket for a removable stool for the motorman.

We claim:

1. The combination of alined seats spaced apart, a supplemental seat arranged parallel to the alined seats, an auxiliary seat on the bottom of the supplementary seat, said auxiliary seat adapted to fit and fill in the space between said alined seats, and means movably and rotatably supporting the supplementary seat and adapted to permit the latter to be moved into coöperating relation with said alined seats and to be spaced therefrom.

2. In a car, the combination of alined seats spaced apart, a supplemental seat arranged parallel to the alined seats, an auxiliary seat on the bottom of the supplementary seat, said auxiliary seat adapted to fit and fill in the space between said alined seats, means movably and rotatably supporting the supplementary seat and adapted to permit the latter to be moved into coöperating relation with said alined seats and to be spaced therefrom, and means for guiding the movement of the supplemental seat into and out of coöperating relation with said alined seats, when moved toward and from the latter.

3. In a car, the combination of alined seats spaced apart, a supplemental seat arranged parallel to the alined seats, an auxiliary seat on the bottom of the supplementary seat, said auxiliary seat adapted to fit and fill in the space between said alined seats, means movably and rotatably supporting the supplementary seat and adapted to permit the latter to be moved into coöperating relation with said alined seats and to be spaced therefrom, means for guiding the movement of the supplemental seat into and out of coöperating relation with said alined seats when moved toward and from the latter, and means for latching the supplemental seat in place when arranged in coöperative relation with said alined seats.

4. In a car, the combination of alined seats spaced apart, a supplemental seat arranged parallel to the alined seats, an auxiliary seat on the bottom of the supplementary seat, said auxiliary seat adapted to fit and fill in the space between said alined seats, means movably and rotatably supporting the supplementary seat and adapted to permit the latter to be moved into coöperating relation with said alined seats and to be spaced therefrom, and means for latching the supplemental seat in place when arranged in coöperative relation with said alined seats.

5. In a car having alined seats extending crosswise near one end of the car, such seats being spaced apart from each other, a supplemental seat located between such alined seats and the car end and arranged parallel to said alined seats, means rotatably supporting said supplemental seat, and such supporting means movable toward and from said alined seats, an auxiliary seat on the bottom of the supplemental seat and adapted to fit and fill in the space between said alined seats.

FREDERIC W. HILD.
FRANK P. MAIZE.
WILLIAM LEWIS COOP.

Witnesses:
A. W. BLAIR,
GUS. J. KELLY.

Copies of this patent may be obtained for five cents each, by addressing the "Commissioner of Patents, Washington, D. C."